(12) United States Patent
Roberts, Jr. et al.

(10) Patent No.: US 6,543,398 B1
(45) Date of Patent: Apr. 8, 2003

(54) HIGH EFFICIENCY COMPRESSION IGNITION AFTERTREATMENT DEVICES FOR COMBINED USE OF LEAN-BURN COMBUSTION SYSTEMS AND THREE-WAY CATALYSTS

(75) Inventors: Charles Edward Roberts, Jr., San Antonio, TX (US); Rudolf Hermann Stanglmaier, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 0 days.

(21) Appl. No.: 09/907,617

(22) Filed: Jul. 19, 2001

(51) Int. Cl.[7] ................... F02B 33/22; F02B 47/08; F02B 43/08
(52) U.S. Cl. ................. 123/58.8; 123/197.1; 123/679; 123/70 R
(58) Field of Search ............... 123/58.8, 52.1, 123/52.4, 59.6, 601, 74, 276, 301, 280, 282, 70 R, 70 V, 71 R, 703

(56) References Cited

U.S. PATENT DOCUMENTS

| | | | | |
|---|---|---|---|---|
| 4,159,700 A | * | 7/1979 | McCrum | 123/59 EC |
| 4,256,064 A | * | 3/1981 | Thorn | 123/59 EC |
| 4,793,135 A | | 12/1988 | Obstfelder et al. | |
| 5,499,605 A | * | 3/1996 | Thring | 123/70 R |
| 5,557,934 A | * | 9/1996 | Beach | 60/517 |
| 5,857,436 A | * | 1/1999 | Chen | 123/70 R |
| 5,930,995 A | | 8/1999 | Watanabe et al. | |
| 6,340,004 B1 | * | 1/2002 | Patton | 123/25 C |

FOREIGN PATENT DOCUMENTS

WO  WO 99/06682  * 2/1999

* cited by examiner

Primary Examiner—Noah P. Kamen
Assistant Examiner—Hai Huynh
(74) Attorney, Agent, or Firm—Baker Botts L.L.P.

(57) ABSTRACT

A high efficiency compression ignition after-treatment system of a combustion engine includes a first combustion chamber adapted to reciprocatably receive a first piston assembly and a second combustion chamber adapted to reciprocatably receive a second piston assembly. A combustion exhaust passage is coupled between the first and the second combustion chambers. A fuel passage may be connected to the first combustion chamber, and a fuel passage connected to the second combustion chamber. A processed exhaust passage is coupled to the second combustion chamber for receiving the processed exhaust therethrough. A fuel injector is coupled to the second combustion chamber. A three-way catalyst has an inlet coupled to the processed exhaust passage and an outlet coupled to an exhaust passage. An exhaust gas oxygen sensor is connected to the processed exhaust passage. A fuel controller is coupled to the fuel injector and the exhaust gas oxygen sensor.

11 Claims, 4 Drawing Sheets

HIGH EFFICIENCY COMPRESSION IGNITION AFTERTREATMENT DEVICES FOR COMBINED USE OF LEAN-BURN COMBUSTION SYSTEMS AND THREE-WAY CATALYSTS

BACKGROUND OF THE INVENTION

1. Field of the Invention

The present invention relates in general to aftertreatment devices for internal combustion engines, and more specifically, to high efficiency compression ignition aftertreatment devices for combined use with lean-burn combustion systems and three-way catalysts.

2. Description of Related Art

The efficiency, power and emissions characteristics of modern, reciprocating engines are a very strong function of their combustion systems. Two primary combustion system types are in common use. Of these, the most common is the spark-ignited, Otto-cycle engine, which derives its output power from the combustion of a premixed, fuel-air-dilutent charge by a propagating flame within the combustion chamber. Spark ignition engines generally suffer from low thermal efficiencies at light-to-part load, due primarily to the necessity of throttling the airflow through the engine to provide a means of load control.

Additionally, the full-load efficiency and power of these engines suffer due to engine design and control limitations brought about by the possibility of high-load knock, or auto-ignition, of the combustible gases within the combustion chamber. The compression ratio of these engines is lower than the optimum value for efficiency to avoid the knock problem. Further, the ignition timing for the combustion process is retarded from optimal values for efficiency, to avoid knock, and reduce $NO_x$ emissions. Increases in the overall efficiency of these engines have been accomplished utilizing lean-burn strategies with turbocharging. However, the knock problem persists and continues to limit the maximum efficiencies of these engines. In addition, exhaust $NO_x$ reduction strategies such as timing retard, exhaust gas recirculation, lean-$NO_x$ catalysts, and selective catalytic reduction (SCR), lead to further decreases in overall engine efficiency.

The second conventional, predominant combustion system utilizes the diesel-cycle, which derives its power from compression ignition and diffusion burning of a fuel spray injected directly into a mixture of air and dilutent gases. Although the diesel engine does not suffer from knock problems, the maximum fuel-to-air ratio is limited by the production of exhausted particulates. Because the diesel combustion flame burns at nearly stoichiometric proportions, $NO_x$ production is high. Exhaust gas recirculation and late injection timing have been used to control in-cylinder $NO_x$ formation, but future $NO_x$ regulations may require additional $NO_x$ reduction strategies such as SCR or use of a lean-$NO_x$ catalyst. Legal restrictions on exhaust gas particulate levels may require particulate aftertreatment devices, such as traps or particulate filters.

U.S. Pat. No. 4,793,135, to Obstfelder et al., which is incorporated herein by references, describes the use of separate combustion systems, in parallel, in the same engine. In one of the described embodiments, one of the combustion systems operates on the Otto, or spark ignition principle, whereas the other combustion system operates on a compression, or auto-ignition principle. The two combustion systems operate independently of one another. The separate exhaust gases from both systems are commingled in a mixer whereat, by mixing, the mixed gas is hopefully detoxified with respect to compounds that are undesirable to downstream catalysts. In this parallel arrangement, the separate combustion systems are regulated in order to generate the main toxic components, carbon monoxide and nitrogen oxides at a precise ratio, one with the other. This regulation inhibits operating the engine at its most efficient load/RPM conditions because spark ignition systems generally operate efficiently at a higher rpm and lower load than compression ignition systems.

SUMMARY OF THE INVENTION

A need has arisen for combustion system to overcome the problems associated with the above-described parallel combustion system.

In an embodiment of the present invention, a high efficiency compression ignition after-treatment system of a combustion engine may comprise a first combustion chamber adapted to reciprocatably receive a first piston assembly; a second combustion chamber adapted to reciprocatably receive a second piston assembly; and an air inlet passage connected to the first combustion chamber; a combustion exhaust passage connected to the first combustion chamber at a first end, and connected to the second combustion chamber at a second end. The system further comprises a fuel injector in fluid communication with the second combustion chamber; at least one fuel passage in fluid communication with the fuel injector; at least one fuel passage in fluid communication with the first combustion chamber; and a processed exhaust gas passage having a first end and a second end. The first end of the processed exhaust gas passage is connected to the second combustion chamber. A three-way catalyst has an inlet coupled to the second end of the processed exhaust gas passage, and an exhaust gas oxygen sensor is connected to the processed exhaust gas passage between the first end and the second end of the processed exhaust gas passage. A fuel controller is coupled to the fuel injector and the exhaust gas oxygen sensor, wherein the fuel controller controls delivery of fuel through the fuel injector in fluid communication with the second combustion chamber in response to a receiving signal from at least said exhaust gas oxygen sensor, and an exhaust gas passage is coupled to an outlet of the three-way catalyst.

In another embodiment of the present invention, the first piston assembly of the system further may comprise a first piston, a first arm secured to the first piston at a first end of the arm, a first crankshaft secured to the arm at a second end of the first arm. The first crankshaft has means for driving the first crankshaft attached to a first end of the first crankshaft.

In yet another embodiment of the present invention, the second piston assembly of the system further may comprise a second piston, a second arm secured to the second piston at a first end of the second arm, a first crankshaft secured to the second arm at a second end of the second arm. The second crankshaft has means for driving the second crankshaft attached to a first end of the second crankshaft.

In still another embodiment of the present invention, the means for driving the first crankshaft is a first pulley, and the means for driving the second crankshaft is a second pulley. A pulley belt may be connected to the first pulley and the second pulley to secure the first piston assembly and the second piston assembly in a rotational relationship. Alternatively, the means for driving the first crankshaft is a first gear, and the means for driving the second crankshaft is a second gear. A chain drive may be connected to the first gear and the second gear to secure the first piston assembly and the second piston assembly in a rotational relationship. In yet another alternative, the system further may comprise a drive shaft equipped with gear teeth at each end of said drive shaft to engage the first gear and the second gear to secure the first piston assembly and the second piston assembly in a rotational relationship.

In yet a further embodiment, the system may comprise at least one spark source connected to the first combustion chamber for spark ignition of a fuel/air mixture in the first combustion chamber during a combustion cycle. In an alternative to this embodiment, the first combustion chamber may be adapted for compression ignition of a fuel/air mixture.

In another embodiment, the invention is a method for efficiently processing exhaust gases from a lean-burn combustion system. The method may comprise the steps of receiving exhaust gases into a combustion chamber; determining an amount of fuel to be injected by a fuel controller into the combustion chamber; and injecting the amount of fuel into the combustion chamber and recombusting the fuel and the exhaust gases therein. The method also comprises the steps of delivering the recombusted exhaust to a combustion exhaust passage; detecting a composition of the recombusted exhaust in the combustion exhaust passage; transmitting the detected composition to the fuel controller; and adjusting the amount of fuel to be injected into the combustion chamber.

The method of this invention further may comprise the steps of delivering the recombusted exhaust to a catalyst and catalyzing said recombusted exhaust. Finally, the method may comprise the step of delivering the catalyzed exhaust to the environment.

Other objects, features, and advantages will be apparent to those of ordinary skill in the art in view of the following detailed description of the invention and the accompanying drawings.

BRIEF DESCRIPTION OF THE DRAWINGS

A more complete understanding of the method and apparatus of the present invention may be obtained by reference to the following detailed description when taken in conjunction with the accompanying drawings.

DETAILED DESCRIPTION OF PREFERRED EMBODIMENTS

Figure 1:
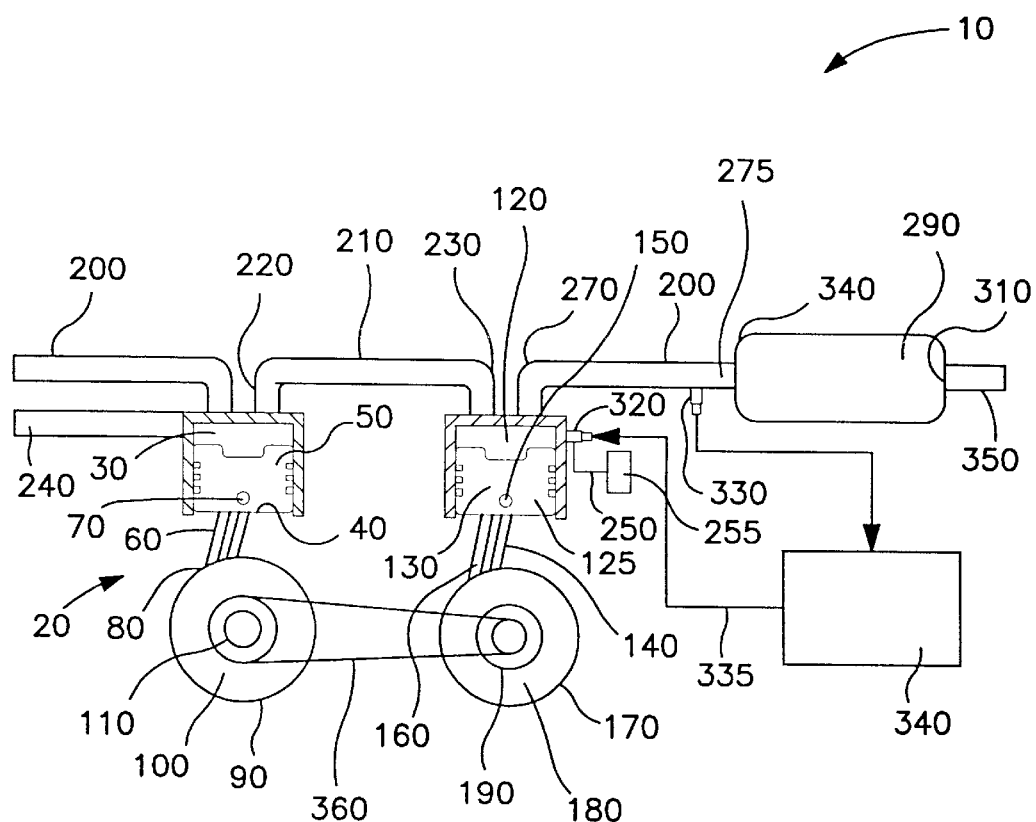
FIG. 1 is a side view of a high efficiency compression ignition after-treatment system according to the principles of the present invention.

The invention may be better understood by reference to FIGS. 1–5, which depict preferred embodiments of the invention and in which like elements are identified by like reference numerals.

Referring first to FIG. 1, there is shown a side view of a high efficiency compression ignition aftertreatment system 10 attached to a combustion engine 20. System 10 includes a first combustion chamber 30 which is adapted to received a first piston assembly 40 reciprocatably disposed therein. First piston assembly 40 includes a first piston 50, an arm 60 secured to the piston 50 at a first end 70 of arm 60. Arm 60 is secured at a second end 80 to a crankshaft 90. Crankshaft 90 has a first end 100 with a pulley 110 attached thereto. First combustion chamber 30 further has at least one spark source (not shown), such as a spark plug, for ignition of a fuel/air mixture in first combustion chamber 30 during a combustion cycle.

Still referring to FIG. 1, system 10 includes a second combustion chamber 120 having a second piston assembly 125 reciprocatably disposed therein. Second piston assembly 125 includes a second piston 130, a second arm 140 secured at a first end 150 to the piston 130 and at a second end 160 to a second crankshaft 170. Second crankshaft 170 has a first end 180 with a pulley 190 attached thereto.

An air inlet passage 200 fluidly connects to first combustion chamber 30 and provides fresh air to first combustion chamber 30. A combustion exhaust passage 210, having a first end 220 coupled to first combustion chamber 30 and a second end 230 coupled to second combustion chamber 120, fluidly connects first combustion chamber 30 with second combustion chamber 120. A first fuel passage 240 is coupled to first combustion chamber 30 to provide fuel to first combustion chamber 30. A second fuel passage 250 extending between a source 255 of pressurized fuel and a fuel injector 320 associated with second combustion chamber 120, provides a controlled flow of fuel to the fuel injector 320. A process exhaust passage 260 is coupled at a first end 270 to second combustion chamber 120 and at a second end 275 to a three way catalyst 290 at an inlet 300 of three-way catalyst 290. The three-way catalyst 290 has an outlet 310 for discharging the treated products of combustion to the atmosphere through an exhaust gas passage 350.

Fuel injector 320 is in fluid communication with second combustion chamber 120, and injects an amount of fuel into second combustion chamber 120 in response to a control signal 335 from a fuel controller 340. Alternatively, fuel injector 320 may be mounted in combustion exhaust passage 210 near second (or exit) end 230. In this configuration, the invention is a port injected engine. An exhaust gas oxygen sensor 330 is disposed in process exhaust passage 260 between first end 270 and second end 275 for measuring processed products of combustion discharged from second combustion chamber 120. Fuel controller 340 receives input signals from various sensors (not shown) indicative of engine operating conditions and, importantly, exhaust gas oxygen sensor 330 that delivers a signal 345 representative of the stoichiometric value of the processed exhaust gas, and then delivers a control signal 335 to An exhaust passage 350 is connected to outlet 310 of three-way catalyst 290 for transporting the final products of combustion. A pulley belt 360 is connected to first pulley 110 and second pulley 190 for maintaining first crankshaft 90 and second crankshaft 170 in a rotational relationship. In another embodiment, second pulley 190 may have a smaller diameter than first pulley 110. Alternatively, the pulleys and the pulley belt may be replaced by a drive chain and the pulleys described above may be replaced by gears, or a direct-drive system, or combinations thereof.

Figure 4:
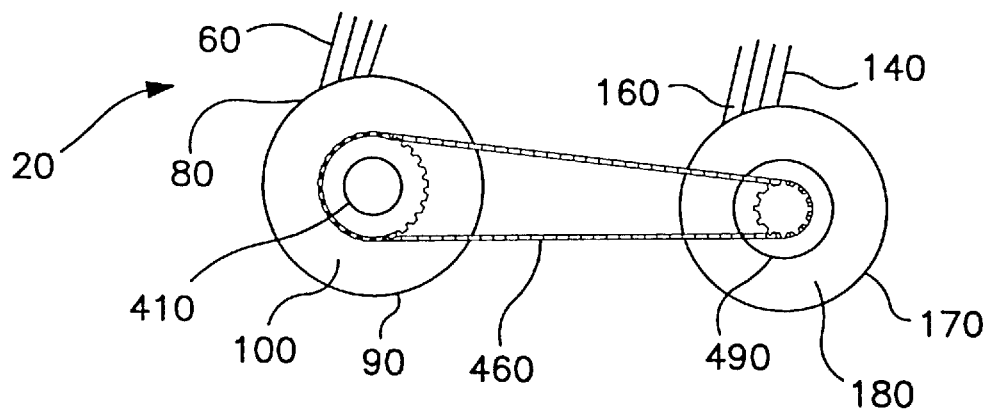
FIG. 4 is an enlarged partial view of the system, as shown in FIG. 1, depicting a chain drive connected to a first gear and a second gear to secure the first piston assembly and the second piston assembly in a rotational relationship.
Figure 5:
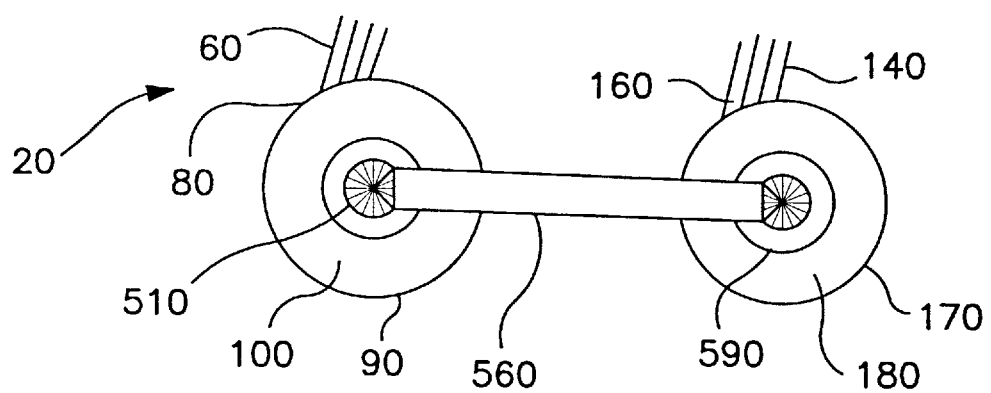
FIG. 5 is an enlarged partial view of the system, as shown in FIG. 1, depicting a drive shaft equipped with gear teeth at each end of the drive shaft to a first gear and a second gear to secure the first piston assembly and the second piston assembly in a rotational relationship.

FIG. 4 is an enlarged partial view of system 10, as shown in FIG. 1, depicting a chain drive 460 is connected to a first gear 410 and a second gear 490 to secure first piston assembly 40 and second piston assembly 125 in a rotational relationship. FIG. 5 is an enlarged partial view of system, as shown in FIG. 1, depicting a drive shaft 560 equipped with gear teeth (e.g., miter gear teeth) at each end of drive shaft 560 to a first gear 510 and a second gear 590 (e.g., miter gears corresponding to miter gear teeth on drive shaft 560) to secure first piston assembly 40 and second piston assembly 125 in a rotational relationship.

The present invention includes a method for efficiently processing the exhaust gases from any lean-burn combustion system in such a way that the processed exhaust gases are delivered as stoichiometric combustion products that can be further treated through use of a three-way catalyst for reduction $NO_x$ and oxidation of unburned hydrocarbons. The exhaust gases from lean-burn combustion system 10, which contain excess air, are ingested by a compressor that contains a fuel emission device which delivers a quantity of fuel sufficient to produce stoichiometric combustion products upon burning. The mixture is compression-ignited, burned, expanded and exhausted. Second combustion-ignition system 10 provides usable power white processing the inlet exhaust gases for subsequent passage through three-way catalyst 290.

System 10 provides an after-treatment method for lean-burn combustion systems that does not penalize the efficiency of the primary combustion system while providing significant reduction in oxides of nitrogen, carbon monoxide and unburned hydrocarbons. In addition, this after-treatment method allows more aggressive primary engine calibration and operation, thus increasing the primary engine efficiency, while still providing reductions in overall emissions of unburned hydrocarbons, CO, and $NO_x$.

Figure 2:
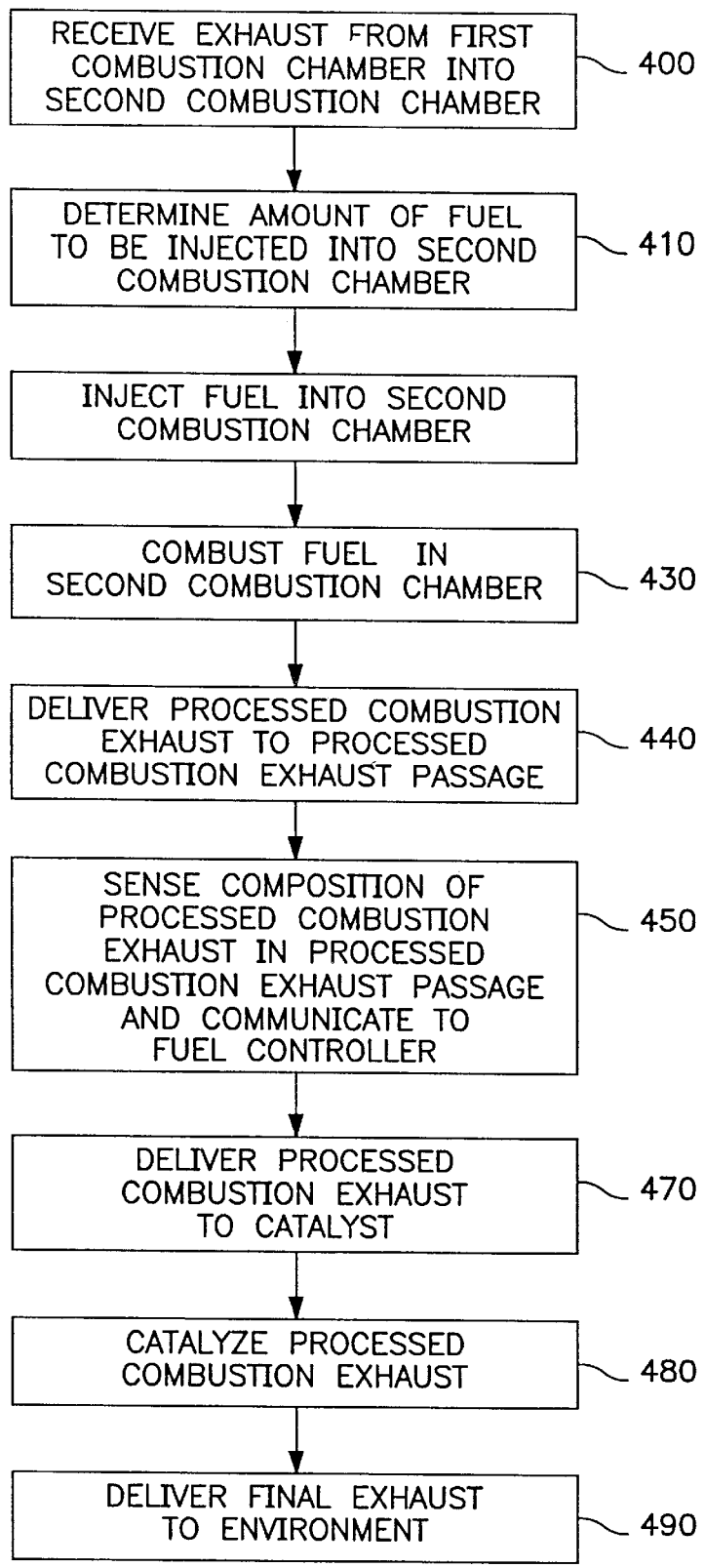
FIG. 2 is a diagrammatic flow chart showing the steps for the method of the after-treatment system of FIG. 1.

Referring now to FIG. 2, there is a shown diagrammatic flow chart showing the steps for method 20 for operation of after-treatment system 10. During a combustion cycle initiated in first combustion chamber 30, the exhaust from first combustion chamber 30 is received into second chamber 120, as indicated by box 400. The stoichiometric ratio of the exhaust gas discharged from second combustion chamber 120 is sensed by exhaust gas oxygen sensor 330 in process exhaust passage 260, and the result is communicated to fuel controller 340 as indicated by box 410. Fuel is injected into the second combustion chamber 120 by fuel injector 320 as directed by fuel controller 340, as indicated by box 420. Fuel controller 340 also receives signals, not shown, such as torque demand, rpm, manifold air pressure and/or other parameters indicative of operating conditions and uses those sensed parameters, along with the sensed stoichiometric ratio of the processed exhaust gas, as indicated at box 350, to determine the actual amount of fuel to inject through fuel injector 320 to maintain a desired exhaust gas composition.

Compression combustion then occurs in second combustion chamber 120 as indicated by box 430. As indicated in step 440, the processed combustion exhaust is expelled into processed combustion exhaust passage 260. Exhaust gas oxygen sensor 330 measures the composition of the processed exhaust and communicates the results to fuel controller 340 in a feedback loop between steps 450 and 410, as indicated in FIG. 2. Fuel controller 340, then readjusts the fuel to be delivered into second combustion chamber 120, as described above, the processed exhaust then is delivered to a catalyst 290 (step 470), which processes the combustion (step 480) and delivers the final exhaust products to the environment (step 490). In this FIG. 2, it is to be understood that the steps are not limited to the order shown. For example, combustion in first combustion chamber 30 may occur more frequently than in second combustion chamber 120.

Figure 3:
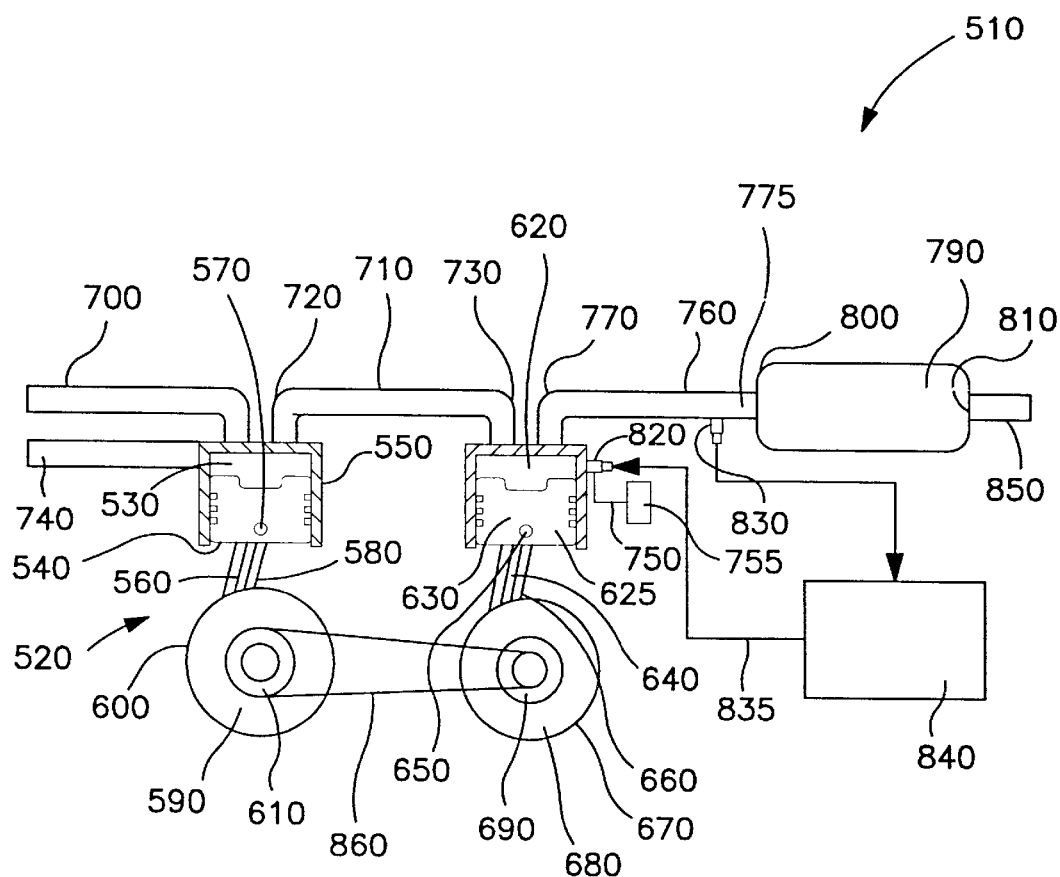
FIG. 3 is a side view of a second embodiment of the high efficiency compression ignition after-treatment system according to the principles of the present invention.

In a second embodiment shown in FIG. 3, there is a shown a side view of a high-efficiency compression ignition after-treatment system 510 attached to a combustion engine 520. System 510 includes a first combustion chamber 530 which is adapted to receive a first piston assembly 40 reciprocatably disposed therein. First piston assembly 540 includes a first piston 550, an arm 560 secured to piston 550 at a first end 570 of arm 560. Arm 560 is secured at a second end 580 to a crankshaft 590. Crankshaft 590 has a first end 600 with a pulley 610 attached thereto. In this embodiment, there are no spark plugs present to initiate combustion in first combustion chamber 30. Rather, a typical diesel-cycle occurs in first combustion chamber 30, wherein compression-ignition of a fuel/air mixture is used during the compression cycle instead of spark ignition.

Still referring to FIG. 3, the system 510 includes a second combustion chamber 620 having a second piston assembly 625 reciprocatably disposed therein. Second piston assembly 625 includes a second piston 630, a second arm 640 secured at a first end 650 to piston 630 and at a second end 660 to a second crankshaft 670. Second crankshaft 670 has a first end 680 with a pulley 690 attached thereto.

An air inlet passage 700 fluidly connects to first combustion chamber 530 and provides fresh air to the first combustion chamber 530. A combustion exhaust passage 710, having a first end 720 coupled to first combustion chamber 530 and a second end 730 coupled to second combustion chamber 620, fluidly connects first combustion chamber 530 with second combustion chamber 620. A first fuel passage 740 is coupled injector 820 associated with second combustion chamber 620, provides a controlled flow of fuel to fuel injector 820. A process exhaust passage 760 is coupled at a first end 770 to second combustion chamber 620 and at a second end 775 to a three-way catalyst 790 at an inlet 800 of three-way catalyst 790. Three-way catalyst 790 has an outlet 810 for discharging the treated products of combustion to the atmosphere through an exhaust gas passage 850.

Fuel injector 820 is in fluid communication with second combustion chamber 620, and injects an amount of fuel into second combustion chamber 620 in response to a control signal 835 from a fuel controller 840. Alternatively, fuel injector 820 may be in fluid communication with intake port 730, at the end of combustion exhaust passage 710. An exhaust gas oxygen sensor 830 is disposed in the process exhaust passage 760 between first end 770 and second end 775 for measuring processed products of combustion discharged from second combustion chamber 620. Fuel controller 840 receives input signals from various sensors (not shown) indicative of engine operating conditions and, importantly, exhaust gas oxygen sensor 830 that delivers a signal 845 representative of the stoichiometric value of the processed exhaust gas, and then delivers a control signal 835 to regulate the amount of fuel delivered to second combustion chamber 620 by fuel injector 820.

An exhaust passage 850 is connected to outlet 810 of three-way catalyst 790 for transporting the final products of combustion. A pulley belt 860 is connected to first pulley 610 and second pulley 690 for maintaining the first crankshaft 590 and second crankshaft 670 in rotational relationship. In another embodiment second pulley 690 may have a smaller diameter than first pulley 610. Alternatively, the pulleys and pulley belt may be replaced with a drive chain, and the pulleys described above may be replaced by gears or a direct-drive system, or combinations thereof.

In operation, system 510 functionally behaves in the same manner as system 10, except for the difference in combustion cycles in first combustion chambers 30 and 530, respectively.

Although embodiments of the present invention have been described in detail herein, the scope of the invention is not limited thereto. It will be appreciated by those skilled in the art that various modifications may be made without departing from the scope of the invention. accordingly, the embodiments disclosed herein are only exemplary, and the scope of the invention is not to be limited thereby, but is to be determined by the claims which follow.

What is claimed is:

1. A high efficiency compression ignition after-treatment system of a combustion engine, comprising:
    a first combustion chamber adapted to reciprocatably receive a first piston assembly;
    a second combustion chamber adapted to reciprocatably receive a second piston assembly;
    an air inlet passage connected to said first combustion chamber;
    a one-directional combustion exhaust passage connected to said first combustion chamber at a first end, and connected to said second combustion chamber at a second end, whereby exhaust is conducted from said first combustion chamber to said second combustion chamber;
    a fuel injector in fluid communication with said second combustion chamber;
    at least one fuel passage in fluid communication with said fuel injector;
    at least one fuel passage in fluid communication with said first combustion chamber;
    a processed exhaust gas passage having a first end and a second end, said first end being connected to said second combustion chamber;
    a three-way catalyst having an inlet coupled to said second end of said processed exhaust gas passage;
    an exhaust gas outlet sensor connected to said processed exhaust gas passage between said first end and said second end of said processed exhaust gas passage;
    a fuel controller coupled to said fuel injector and said exhaust gas outlet sensor, wherein said fuel controller controls delivery of fuel through said fuel injector in fluid communication with said second combustion chamber in response to a receiving signal from at least said exhaust gas outlet sensor; and
    an exhaust gas passage coupled to an outlet of said three-way catalyst.

2. The system of claim 1, wherein said first piston assembly includes a piston, an arm secured to said piston at a first end of said arm, a first crankshaft secured to said arm at a second end of said arm, said crankshaft having means for driving said first crankshaft attached to a first end of said first crankshaft.

3. The system of claim 2, wherein said second piston assembly includes a piston, an arm secured to said piston at a first end of said arm, and a second crankshaft secured to said arm at a second end of said arm, said crankshaft having means for driving said second crankshaft attached at a first end of said second crankshaft.

4. The system of claim 3, wherein said means for driving said first crankshaft is a first pulley and said means for driving said second crankshaft is a second pulley, and further comprising a pulley belt connected to said first pulley and said second pulley to secure said first piston assembly and said second piston assembly in a rotational relationship.

5. The system of claim 3, wherein said means for driving said first crankshaft is a first gear and said means for driving said second crankshaft is a second gear, and further comprising a chain drive connected to said first gear and said second gear to secure said first piston assembly and said second piston assembly in a rotational relationship.

6. The system of claim 3, wherein said means for driving said first crankshaft is a first gear and said means for driving said second crankshaft is a second gear, and further comprising a drive shaft equipped with gear teeth at each end of said drive shaft to engage said first gear and said second gear to secure said first piston assembly and said second piston assembly in a rotational relationship.

7. The system of claim 3, further comprising at least one spark source connected to said first combustion chamber for spark ignition of a fuel/air mixture in said first combustion chamber during a combustion cycle.

8. The system of claim 3, wherein said first combustion chamber is adapted for compression ignition of a fuel/air mixture.

9. A method for efficiently processing exhaust gases from a lean-burn combustion system, wherein said system comprises a first combustion chamber and a second combustion chamber, comprising the steps of:
    receiving exhaust gases into said second combustion chamber;
    determining an amount of fuel to be injected by a fuel controller into said second combustion chamber;
    injecting said amount of fuel into said second combustion chamber and recombusting said fuel and said exhaust gases therein;
    delivering said recombusted exhaust to a one-directional combustion exhaust passage, whereby exhaust is conducted from said first combustion chamber to said second combustion chamber;
    detecting a composition of said recombusted exhaust in said combustion exhaust passage;
    transmitting said detected composition to said fuel controller; and
    adjusting said amount of fuel to be injected into said second combustion chamber.

10. The method of claim 9, further comprising the steps of:
    delivering said recombusted exhaust to a catalyst; and
    catalyzing said recombusted exhaust.

11. The method of claim 10, further comprising the step of delivering said catalyzed exhaust to the environment.

\* \* \* \* \*